United States Patent
Wagoner et al.

(10) Patent No.: US 9,287,766 B2
(45) Date of Patent: Mar. 15, 2016

(54) POWER SYSTEM JUNCTION TEMPERATURE CONTROL

(75) Inventors: Robert Gregory Wagoner, Roanoke, VA (US); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 650 days.

(21) Appl. No.: 13/246,042

(22) Filed: Sep. 27, 2011

(65) Prior Publication Data
US 2013/0076327 A1 Mar. 28, 2013

(51) Int. Cl.
*H02M 1/32* (2007.01)

(52) U.S. Cl.
CPC .......... *H02M 1/32* (2013.01); *H02M 2001/327* (2013.01)

(58) Field of Classification Search
CPC .......... G05F 3/30; G05F 3/245; H02M 3/156; H02M 3/1588; H02M 1/32; H02M 2001/327; H03K 17/0822; H03K 2017/0806
USPC ............. 323/907, 284; 363/50, 141; 307/117; 361/93.8
See application file for complete search history.

(56) References Cited

U.S. PATENT DOCUMENTS

| | | | |
|---|---|---|---|
| 5,923,135 A | 7/1999 | Takeda | |
| 6,078,511 A | 6/2000 | Fasullo et al. | |
| 2004/0124808 A1 | 7/2004 | Hirono | |
| 2005/0231146 A1 | 10/2005 | De Frutos | |
| 2006/0125449 A1* | 6/2006 | Unger | H02J 7/022 320/141 |
| 2006/0167657 A1* | 7/2006 | Naffziger et al. | 702/182 |
| 2007/0059886 A1* | 3/2007 | Chen | G06F 17/5036 438/268 |
| 2007/0120535 A1 | 5/2007 | Wallace | |
| 2008/0285192 A1 | 11/2008 | Phadke et al. | |
| 2009/0008938 A1 | 1/2009 | Erdman | |
| 2010/0133831 A1 | 6/2010 | Scholte-Wassink et al. | |
| 2011/0013670 A1* | 1/2011 | Tustaniwskyj | G01K 7/01 374/183 |
| 2012/0109572 A1* | 5/2012 | Shimizu | 702/131 |

FOREIGN PATENT DOCUMENTS

EP 0792008 A2 8/1997

OTHER PUBLICATIONS

Search Report and Written Opinion from corresponding PCT Application No. PCT/US2012/057675, dated Jul. 29, 2013.

* cited by examiner

*Primary Examiner* — Fred E Finch, III
*Assistant Examiner* — Gustavo Rosario Benitez
(74) *Attorney, Agent, or Firm* — James McGinness, Esq.; Armstrong Teasdale LLP

(57) ABSTRACT

An electrical power generating system including a power generating device, a power converter connected to the power generating device, and an electrical controller connected to the power converter. The electrical controller is configured to limit a peak junction temperature of the power converter by applying at least one junction temperature derating function.

11 Claims, 4 Drawing Sheets

POWER SYSTEM JUNCTION TEMPERATURE CONTROL

BACKGROUND OF THE INVENTION

The field of the present disclosure relates generally to a system and method of operating a power generating system to control a peak junction temperature. More particularly, the present disclosure relates to photovoltaic (e.g., solar power) and wind (e.g., wind turbine) power generating systems, including a controller that limits the peak junction temperature.

Typically, in power generation systems, the power produced by the solar module and wind turbine is direct-current (DC) power which must be converted to alternating current (AC) for export to the power grid. Typically, converters include insulated gate bipolar transistors (IGBTs) or other power semiconductors. The semiconductors typically operate within a normal range of operating temperatures. IGBT junction temperatures are typically rated at either 125° C., 150° C., or 175° C. maximum depending upon the type of IGBT. The semiconductors have an upper limit junction temperature at which they may be reliably operated. Exceeding the upper limit junction temperature of the semiconductors may cause undesirable reductions in operating efficiency and/or failure of the semiconductors.

Temperature increases at the semiconductor junctions may be caused by a variety of factors. For example, air filters of cooling systems for the semiconductors may become dirty/clogged thereby reducing an amount of cooling medium available to cool the semiconductors. Other environmental factors, such as high outdoor temperatures, high altitude, humidity levels, sunlight and the like may also undesirably increase the operating temperature of the semiconductors. Operating factors such as high output power of the converter and transient power events may also increase the junction temperature of the semiconductors and the like. Combinations of such factors may be applied simultaneously, causing more rapid and sustained high junction temperatures.

Typically, when the junction temperature of the semiconductors in the converter reaches an upper limit, a circuit breaker may be utilized to trip (i.e., shut down) the converter to prevent a failure of the converter. Further, operating the converters at high temperatures may undesirably reduce the life of the converter. If the converter is shut down due to high junction temperatures, the converter may remain in an off state until the semiconductor junction temperatures have decreased to an acceptable level. Such shutting down of the converter is typically undesirable because it may reduce or eliminate the ability for the power generating system to supply electrical power.

BRIEF DESCRIPTION OF THE INVENTION

In one aspect, an electrical power generating system is includes a power generating device, a power converter connected to the power generating device, and an electrical controller connected to the power converter. The electrical controller is configured to limit a peak junction temperature of the converter by applying at least one junction temperature derating function.

In another aspect, a method of controlling a power converter of an electrical power generating system includes sensing a temperature, applying at least one junction temperature derating function that is based upon the sensed temperature to limit the power output of the power converter and limiting the power of the power converter until a predetermined condition is met.

In a further aspect, a non-transitory computer readable storage medium storing program instructions for controlling a power converter of an electrical power generating system include instructions for sensing a temperature using a temperature sensing device, applying at least one junction temperature derating function that is based upon on the sensed temperature to limit the power output of the power converter and limiting the power of the power converter until a predetermined condition is met.

DETAILED DESCRIPTION OF THE INVENTION

The methods and systems described herein facilitate controlling a power converter of an electrical power generating system. The technical effects of the methods and systems of the present disclosure provide the ability to limit a peak junction temperature of the converter by applying one or more power limiting factors derived by a junction temperature derating function.

Figure 1:
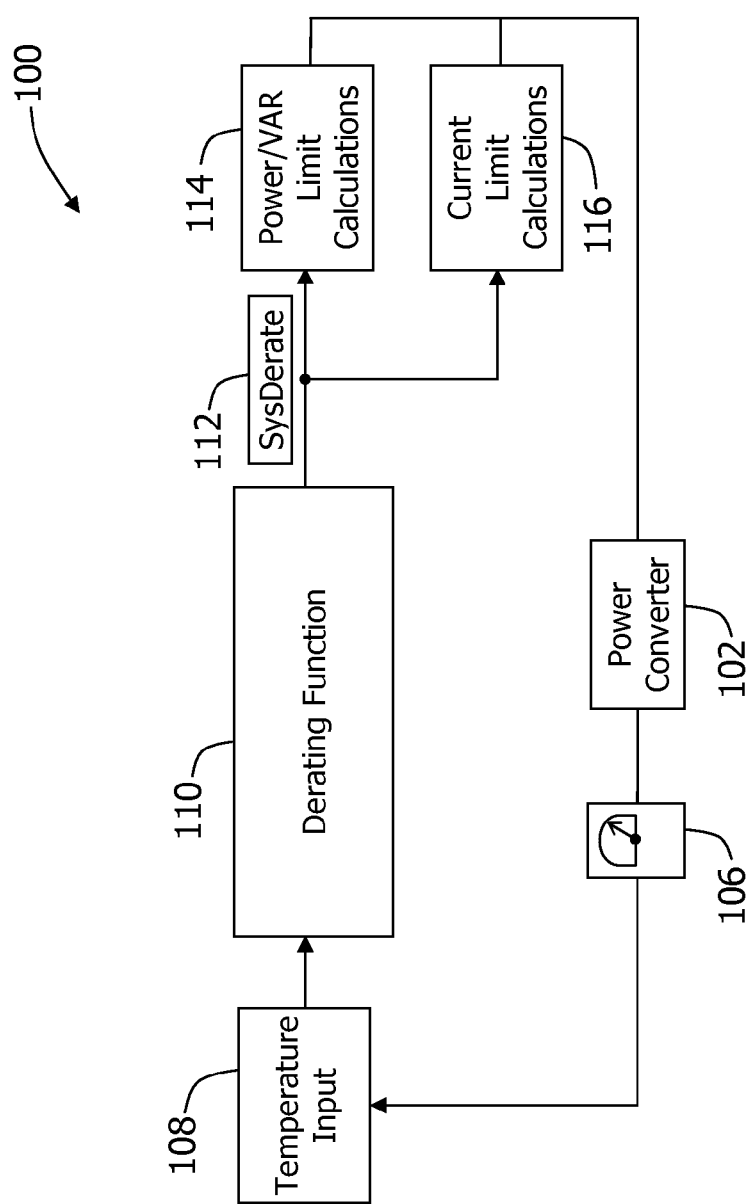
FIG. 1 is a block diagram of an exemplary embodiment of the present disclosure.

Shown in FIG. 1 is a block diagram of an exemplary embodiment of a control system of the present disclosure. The control system includes a controller 100 connected to a power converter 102 of a power generation system 105 (shown in FIG. 2). In one embodiment, the controller 100 is connected to the power converter 102 via a feedback loop arrangement or other arrangements that allow the control system of the present disclosure to function as described herein.

Figure 4:
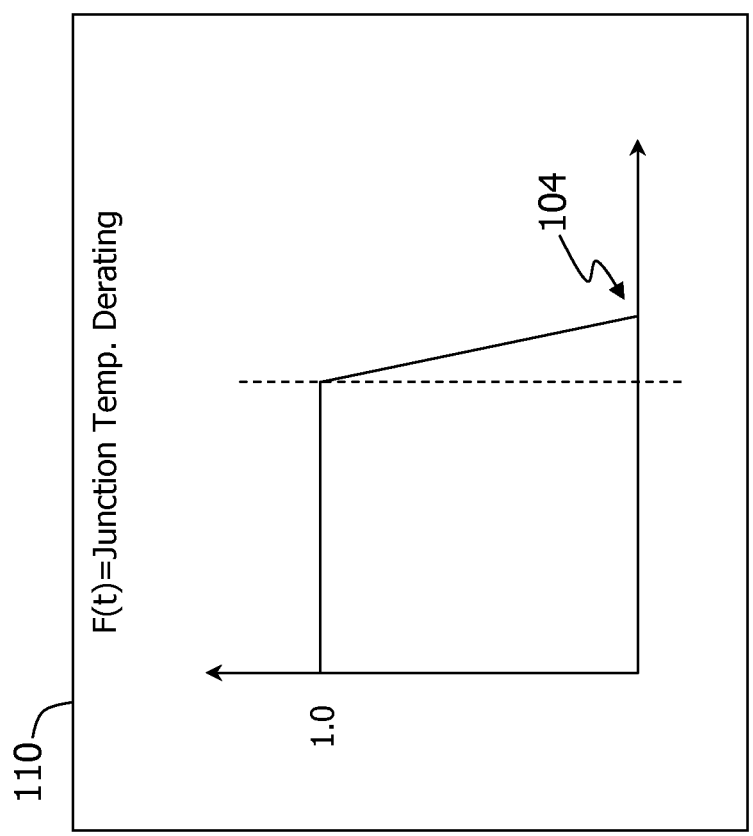
FIG. 4 is a chart of an exemplary junction temperature derating function of the present disclosure.

During operation of power converter 102, the semiconductor components (or other mechanical or electrical components) of power converter 102 generate heat. Power converter 102 has a maximum operating temperature 104 (FIG. 4) at which the power converter may reliably operate. In embodiments, maximum operating temperature 104 is, for example, a predetermined temperature or a temperature found experimentally to be the maximum operating temperature at which power converter 102 operates reliably. Reliable operation as used herein, refers to normal operating conditions at which no permanent substantial damage occurs to the device. In one embodiment, the power converter 102 is operated with a margin below the junction temperature rating. For example an IGBT rated at 125° C. is operated with IGBT junction temperatures at 90° C. typical, leaving margin for line surges and overloads, which cause the IGBT junction temperatures to increase momentarily until the surge or overload ends. In another embodiment, the control system includes an over-temperature warning indication at a temperature above the margin and below the maximum junction temperature, for example, an over-temperature warning is provided at 115° C. and an over-temperature circuit trip is triggered at 125° C. In other embodiments, maximum operating temperature 104 is a temperature value associated with a junction temperature of a semiconductor of power converter 102 or a maximum operating temperature of one or more other components of power converter 102.

A temperature of power converter 102 is determined, for example, by a temperature sensor 106 that contacts the power converter 102 or senses the temperature of power converter 102 in a non-contact manner. Temperature sensor 106 outputs a temperature of power converter 102 to controller 100 as an input 108. In one embodiment, the output temperature is a temperature of a single component or multiple components. In other embodiments, the temperature sensor also senses an ambient temperature and outputs the ambient temperature to controller 100. Temperature sensor 106 may also sense and output any temperature that allows the control system of the present disclosure to operate as described herein. In another embodiment, if multiple temperatures are sensed by temperature sensor 106, a maximum sensed temperature is output from temperature sensor 106 as input 108 to controller 100.

Input 108 is transmitted to controller 100 and is used as an input value for a derating function 110, such as a junction temperature derating function. In one embodiment, derating function 100 is a unit function, for example, with a range of values from 0.0 to 1.0 on the vertical axis. In embodiments, the horizontal axis represents, for example, temperature values.

In one embodiment, derating function 110 is utilized to calculate a system derating factor 112 (i.e., a vertical axis value) associated with input 108. As shown in FIG. 1, derating function 110 has a range of temperatures at which factor 112 remains constant, and beyond which factor 112 is reduced. In one embodiment, a factor value of 1.0 represents input 108 values associated with normal operating temperatures of power converter 102.

Factor 112 is then used by controller 100 to control a power output amount of power converter 102. In one embodiment, a factor of 1.0 is used to control power converter 102 to operate at maximum power, and a factor of 0.0 is used to control the power converter 102 to shut down, or operate at a minimum operating power. In another embodiment, a factor of 0.5 is used to instruct power converter 102 to operate at 50% power. Factor 112 may be used to instruct power converter 102 to operate at any power level that allows the control system of the present disclosure to function as described herein.

In embodiments, factor 112 is directly input and used to control power converter 102. In other embodiments, factor 112 is first transmitted to and used in further calculations such as, for example, power/var limit calculations 114 and current limit calculations 116. In still other embodiments, output of power/var limit calculations 114 and/or current limit calculations 116 is input and used to control power converter 102 as factor 112.

Factor 112 thus may be used to control the power output of power converter 102. For example, power converter 102 may initially operate at 100% power output. The temperature of the power converter 102 is sensed by temperature sensor 106 and output to controller 100 as input 108. Controller 100 processes input 108 using derating function 110. If input 108 is within a normal operating range of power converter 102, the calculated value of the derating factor 112 is 1.0, for example. Thus, power converter 102 will be instructed to continue operating at 100% power output, for example.

However, if input 108 is outside of the normal operating range of power converter 102 (i.e., a value to the right of the vertical dashed line indicated in derating function 110), the derating factor is calculated to be less than 1.0. In one embodiment, if power converter 102 is operating at a high temperature at or near the maximum operating temperature, input 108 is outside of the normal operating range. Thus, derating function 110, using input 108, outputs a derating factor 112 that is less than 1.0. The derating factor 112 is then used to instruct/control power converter 102 to operate at a power level less than 100%.

In one embodiment, power converter 102 is instructed to operate at the given power level until a predetermined condition is met, for example, until a predetermined time has passed or until temperature sensor 106 senses that power converter 102 is operating at a normal operating temperature. For example, temperature sensor 106 may continuously or incrementally monitor the temperature of power converter 102 and continuously or incrementally output the temperature to controller 100 as input 108. Thus, power converter 102 may be controlled in real time, or at discrete time intervals.

In one embodiment, power converter 102 is thus controlled to operate at a reduced power level. For example, power converter 102 is controlled to operate at a reduced power level according to a range of temperatures. The control system of the present disclosure thus allows for the possibility of operating power converter 102 at a reduced power level when power converter 102 is at a temperature outside of the normal operating range, thereby avoiding unnecessary shut downs and maximizing up-time of power converter 102.

Figure 2:
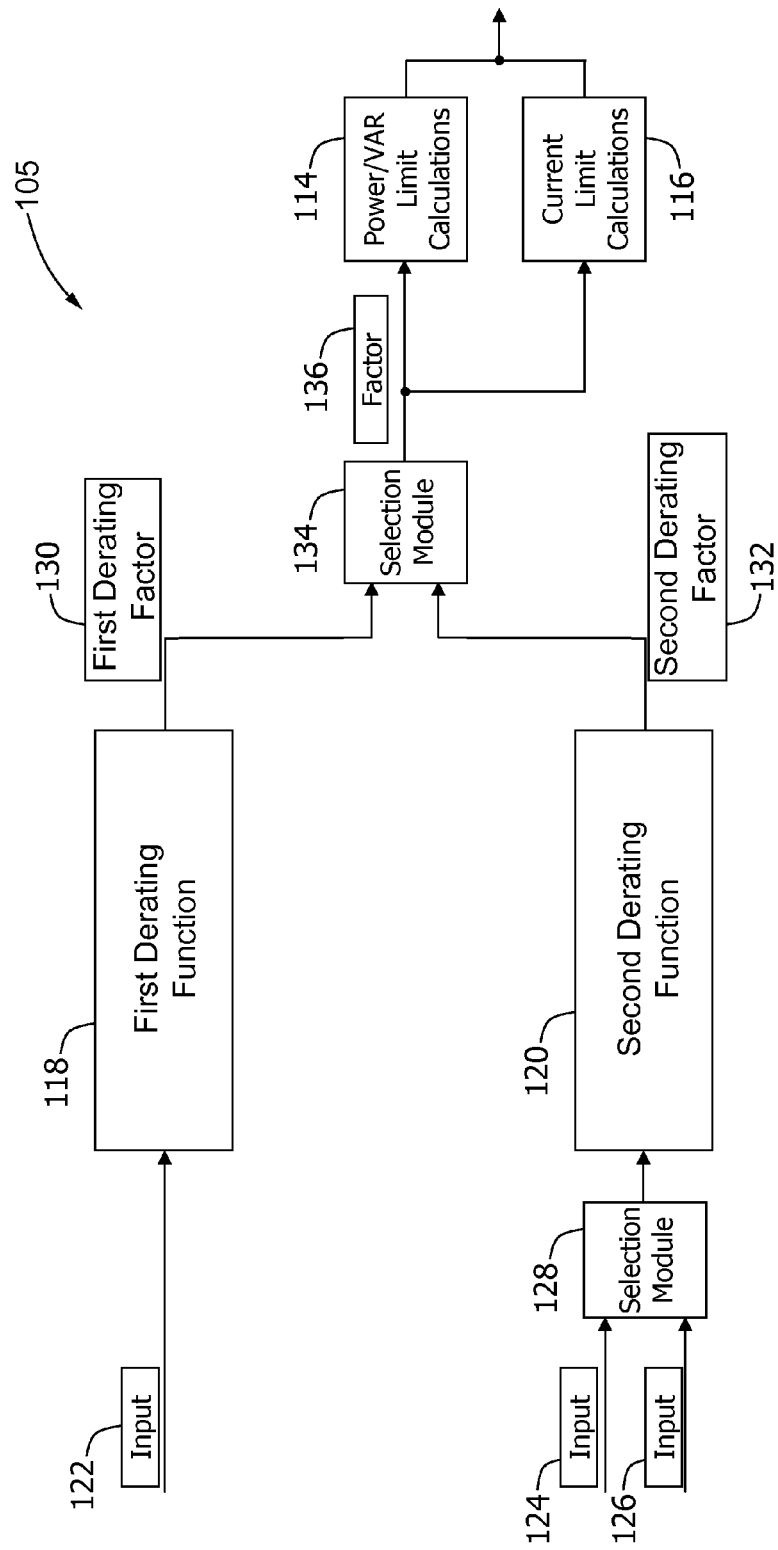
FIG. 2 is a block diagram of a second embodiment of the present disclosure.

Shown in FIG. 2 is a block diagram of a second exemplary embodiment of a control system of the present disclosure utilizing a plurality of derating functions. For example, controller 100, in one embodiment, includes a first derating function 118 and a second derating function 120. First derating function 118 is supplied with a first input 122 that may be, for example, a temperature of power converter 102 or an ambient temperature of the operating environment of power converter 102. First input 122 may be any input values that allow the control system of the present disclosure to function as described herein.

Second derating function 120 is supplied with a second input 124. In embodiments, a second input 124 and a third input 126 are input to a selection module 128. Selection module 128 selects a maximum, or minimum, value of second input 124 and the third input 126 to be used as input to second derating function 120. Second input 124 and third input 126 are, for example, a first temperature of power converter 102 and a second temperature of power converter 102 taken at a different location from the first temperature. However, second input 124 and the third input 126 may be any input values that allow the control system of the present disclosure to function as described herein.

In one embodiment, first derating function 118 outputs a first derating factor 130 and the second derating function 120 outputs a second derating factor 132. In another embodiment, first derating factor 130 and second derating factor 132 are transmitted into a derating factor selection module 134 that compares and/or selects, a minimum derating factor of first derating factor 130 and second derating factor 132. The derating factor selection module 134 outputs the selected derating factor as derating factor 136.

Derating factor 136 is then transmitted directly, or via power/var calculation 114 and/or current limit calculation 116, to power converter 102 to be used as a control value as discussed above.

Figure 3:
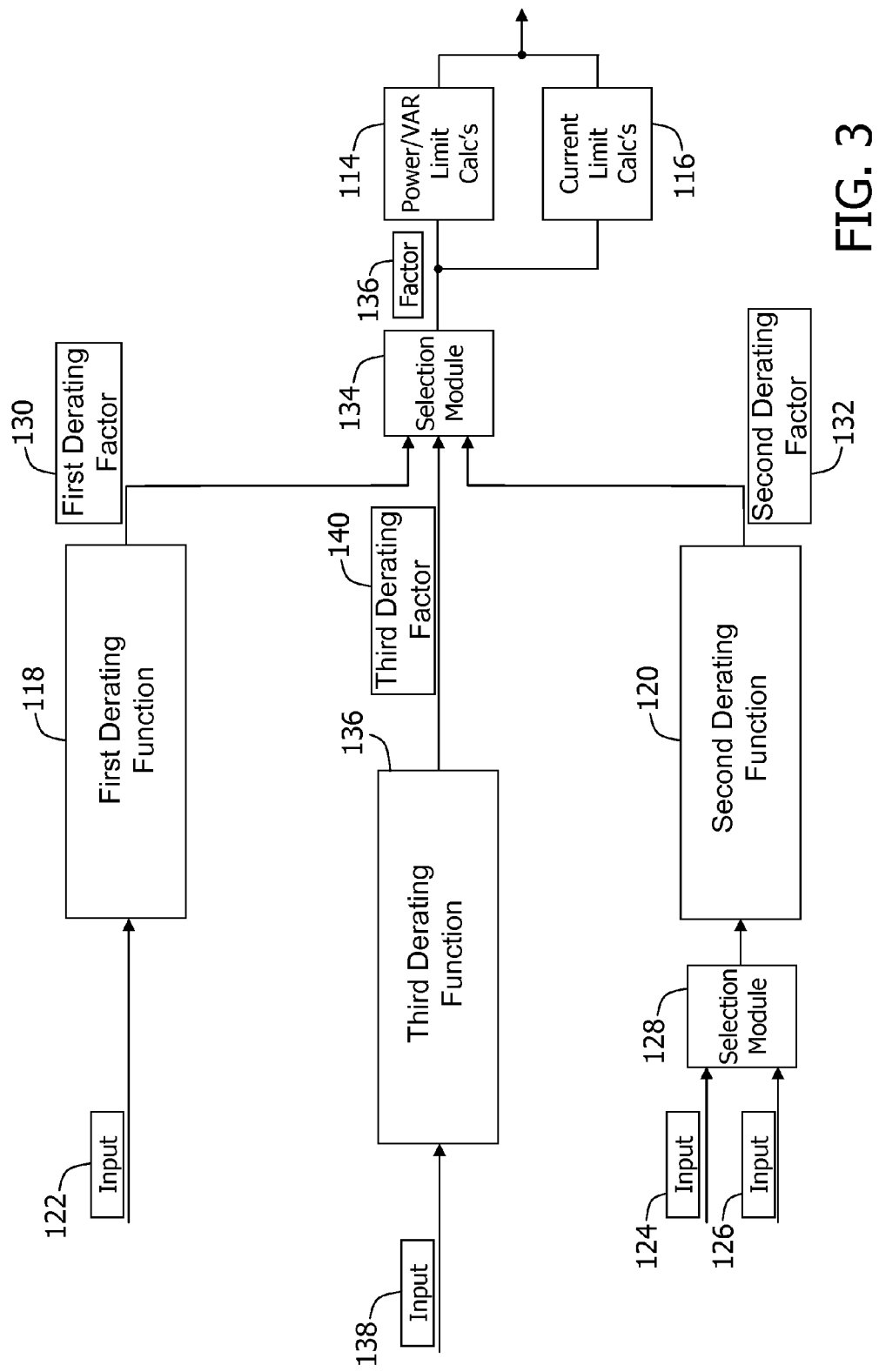
FIG. 3 is a block diagram of a third embodiment of the present disclosure.

In a third exemplary embodiment, as shown in FIG. 3, the control system of the present disclosure includes three or more derating functions 118, 120 and 136.

The operation of the control system according to the third embodiment may be similar to the operation described above. However, in the third embodiment, a third derating function 136 is used in conjunction with first derating function 118 and second derating function 120. In embodiments, third derating function 136 receives fourth input 138. In one embodiment, fourth input 138 is a baseplate temperature of power converter 102, a temperature of power converter 102, an ambient temperature of the operating environment of power converter 102 or the like. Fourth input 138 may be any input value that allows the control system of the present disclosure to function as described herein.

A third derating factor 33 is calculated and output from derating function 23. The first derating factor 130, second derating factor 132 and third derating factor 140 may be input to derating factor selection module 134. Derating factor selection module 134 compares and/or selects, for example, a minimum derating factor of first derating factor 130, second derating factor 132 and third derating factor 140. Derating factor selection module 134 outputs the selected derating factor as derating factor 136.

Derating factor 136 is then transmitted directly, or via power/var calculation 114 and/or current limit calculation 116, to power converter 102 to be used as a control value as discussed above.

In some embodiments, the systems and method disclosed herein may be incorporated into a computer or stored on a computer readable medium.

The embodiments described herein are not limited to any particular system controller or processor for performing the processing tasks described herein. The term controller or processor, as used herein, is intended to denote any machine capable of performing the calculations, or computations, necessary to perform the tasks described herein. The terms controller and processor also are intended to denote any machine that is capable of accepting a structured input and of processing the input in accordance with prescribed rules to produce an output. It should also be noted that the phrase "configured to" as used herein means that the controller/processor is equipped with a combination of hardware and software for performing the tasks of embodiments of the invention, as will be understood by those skilled in the art. The term controller/processor, as used herein, refers to central processing units, microprocessors, microcontrollers, reduced instruction set circuits (RISC), application specific integrated circuits (ASIC), logic circuits, and any other circuit or processor capable of executing the functions described herein.

The embodiments described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical power generating system, comprising: a power generating device; a power converter connected to the power generating device; and an electrical controller connected to the power converter, wherein the electrical controller is configured to limit a peak junction temperature of the power converter by applying at least one junction temperature derating function and wherein a power derating factor derived from the junction temperature derating function is applied to the electrical controller to reduce at least one of an output power, current or voltage of the power converter, wherein the power derating factor is based on a minimum power derating factor selected from a plurality of power derating factors, each power derating factor derived from a respective junction temperature derating function, wherein a first power derating factor of the plurality of power derating factors has a first numerical value and a second power derating factor of the plurality of power derating factors has a second numerical value, the electrical controller further configured to compare the first numerical value with the second numerical value, determine the lower value of the first numerical value and the second numerical value, and select the lower value as the minimum power derating factor.

2. The electrical power generating system according to claim 1, further comprising a temperature sensor that senses a temperature of the power converter and transmits the sensed temperature to the electrical controller.

3. The electrical power generating system according to claim 2, wherein the junction temperature derating function is a function of the sensed temperature.

4. The electrical power generating system according to claim 2, wherein the electrical controller is configured to limit the output power of the power converter until the sensed temperature reaches a predetermined value.

5. A method of controlling a power converter of an electrical power generating system, said method comprising:
sensing a plurality of temperatures;
applying at least one junction temperature derating function that is based upon each sensed temperature to limit the power output of the power converter;
deriving a plurality of power derating factors, each power derating factor derived from a respective junction temperature derating function, wherein a first power derating factor of the plurality of power derating factors has a first numerical value and a second power derating factor of the plurality of power derating factors has a second numerical value;
comparing the first numerical value with the second numerical value;
determining the lower value of the first numerical value and the second numerical value;
selecting the lower value as a minimum power derating factor;
limiting the power of the power converter using the minimum power derating factor until a threshold temperature value of the power converter is met; and
limiting the power output of the power converter using the minimum power derating factor until the sensed temperature of the power converter is at or below the threshold temperature value.

6. The method according to claim 5, wherein sensing the plurality of temperatures comprises sensing a plurality of temperatures of the power converter.

7. The method according to claim 5, wherein the selected minimum power derating factor derived from the respective junction temperature derating function is applied to reduce at least one of an output power, current or voltage of the power converter.

8. A non-transitory computer readable storage medium storing program instructions for controlling a power converter of an electrical power generating system, the program instructions comprising instructions for:
sensing a plurality of temperatures using a plurality of temperature sensing devices;
applying at least one junction temperature derating function that is based upon each sensed temperature to limit the power output of the power converter;
deriving a plurality of power derating factors, each power derating factor derived from a respective junction temperature derating function, wherein a first power derating factor of the plurality of power derating factors has a first numerical value and a second power derating factor of the plurality of power derating factors has a second numerical value;
comparing the first numerical value with the second numerical value;
determining the lower value of the first numerical value and the second numerical value;
selecting the lower value as a minimum power derating factor;
limiting the power of the power converter using the minimum power derating factor until a predetermined condition is met; and
applying the selected minimum power derating factor to reduce at least one of an output power, current or voltage of the power converter.

9. The non-transitory computer readable storage medium according to claim 8, wherein sensing the plurality of temperatures comprises sensing a plurality of temperatures of the power converter.

10. The non-transitory computer readable storage medium according to claim 9, wherein:
the predetermined condition is a threshold temperature value of the power converter; and
limiting the power comprises limiting the power output of the power converter until the sensed temperature of the power converter is at or below the threshold temperature value.

11. The non-transitory computer readable storage medium according to claim 8, wherein the selected minimum power derating factor is a real number between 0 and 1.0.

* * * * *